A. ENGELSTAD.
PROCESS AND APPARATUS FOR MAKING HYDROCHLORIC ACID.
APPLICATION FILED FEB. 4, 1914.
1,121,910.
Patented Dec. 22, 1914.
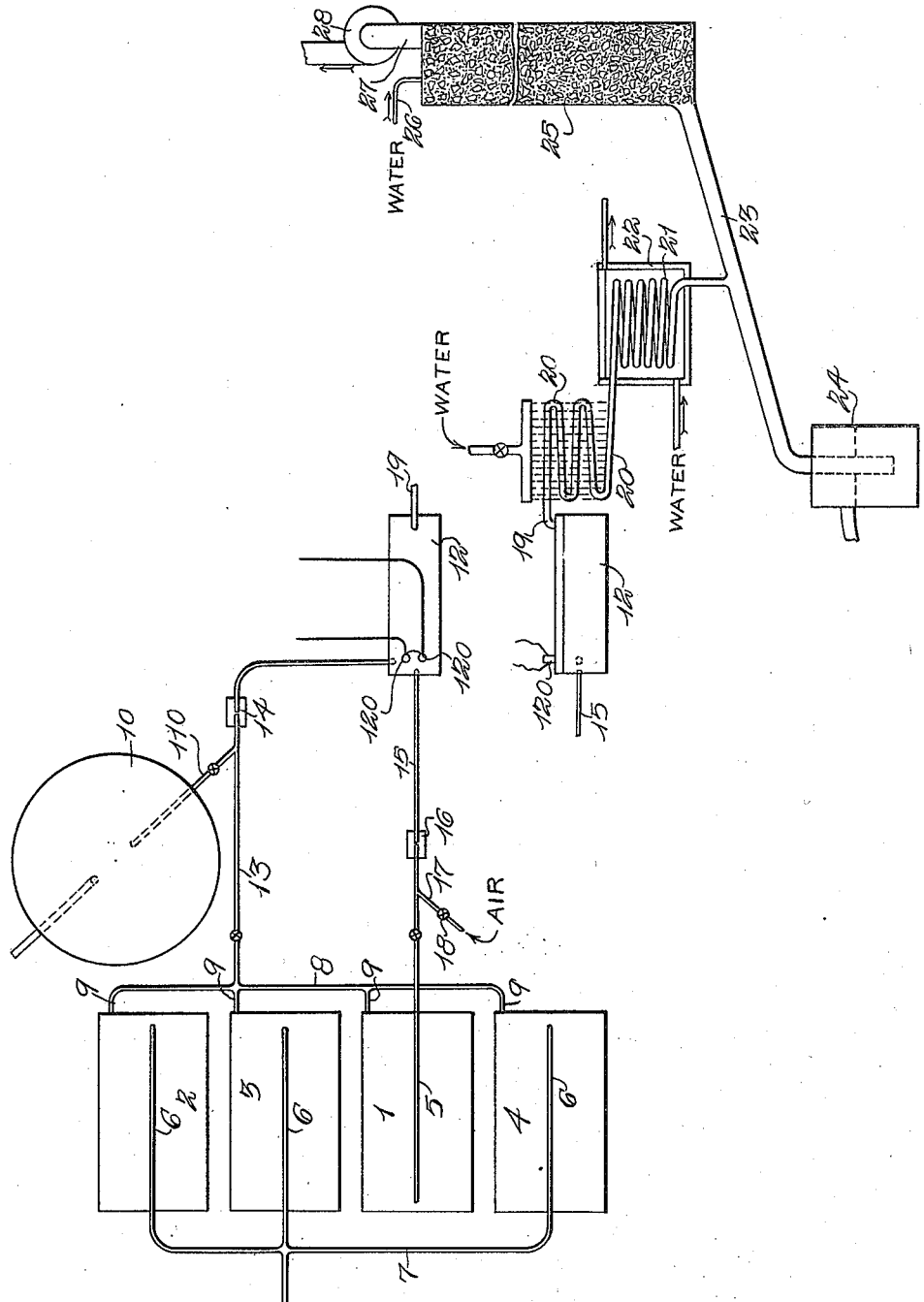

UNITED STATES PATENT OFFICE.

ALF ENGELSTAD, OF BERLIN, NEW HAMPSHIRE.

PROCESS AND APPARATUS FOR MAKING HYDROCHLORIC ACID.

1,121,910.      Specification of Letters Patent.      Patented Dec. 22, 1914.

Application filed February 4, 1914. Serial No. 816,457.

*To all whom it may concern:*

Be it known that I, ALF ENGELSTAD, a subject of the King of Norway, and a resident of Berlin, in the county of Coos and State of New Hampshire, have invented certain new and useful Improvements in Processes and Apparatus for Making Hydrochloric Acid, of which the following is a specification.

This invention has for its object the manufacture of hydrochloric acid synthetically and continuously from chlorin and hydrogen. This is accomplished by the ignition and burning of two streams of the gases in a suitable combustion chamber, in which the combustion is sustained or supported by the combustion of one or more other gases. For example, according to my process, I may constantly supply to the combustion chamber chlorin and oxygen at ordinary or atmospheric temperatures, and a sufficient quantity of hydrogen to insure the simultaneous combustion of the oxygen and of the chlorin, one in the presence of the other. The water vapor, resulting from the combustion of the hydrogen and the oxygen, may be condensed and employed for absorbing hydrochloric acid produced by the other reaction, additional water, if necessary, being supplied from an outside source for the absorption of the remaining acid. Instead of supplying merely enough hydrogen for the quantitive reactions with the chlorin and the oxygen, I preferably supply a constant large excess of hydrogen for reducing the temperature in the combustion chamber. It is evident that I may supply to the combustion chamber the three gases in substantially pure form, regulating the supply of each of them to secure the optimum results. According to modern methods, however, in many plants, electrolytic cells are employed for the manufacture of caustic soda with the production of chlorin and hydrogen as by-products. In such plants, as a practical matter, it is unnecessary to secure the gases in an absolutely pure state, more or less water vapor being delivered with the chlorin and with the hydrogen, and a relatively large proportion of air finding its way into the chlorin ducts, particularly when the chlorin and the hydrogen are removed from the cells by suction. My process, therefore, provides a method for commercially making hydrochloric acid even when there are relatively large quantities of air and water vapor mixed with the chlorin.

On the accompanying drawings, I have illustrated more or less conventionally apparatus which may be utilized in carrying out my process.

On the drawings, I have indicated at 1, 2, 3 and 4 a plurality of electrolytic cells such as are utilized in the decomposition of a solution of sodium chlorin for the manufacture of chlorin and caustic soda. I have illustrated only four of these cells, but it will be understood that a large number may be utilized. From the cell indicated at 1, the chlorin is drawn by suction through the conduit 5, there being like conduits at 6 leading from the other cells 4, 3 and 2 to a manifold 7 which delivers the chlorin for use in the manufacture of bleach or other materials. From all of the cells indicated, conduits 9 are provided for supplying the hydrogen evolved in the cathode chambers to a manifold 8. The chlorin and the hydrogen supplied by the cells are conducted to a combustion chamber 12, the hydrogen being conducted thereto from the manifold 8 by a conduit 13 having a water-seal 14, and the chlorin being conducted thereto from the conduit 5 by a conduit 15 provided with a water-seal 16. It will be observed that the chlorin and hydrogen from the cells are supplied in the proportion of 1 to 4, the hydrogen being greatly in excess of that required for the production of hydrochloric acid. The combustion chamber 12 consists preferably of an elongated narrow box made of fire-brick, quartz or other suitable fire-proof material, and having a removable cover of like material. The conduit 15 for the chlorin terminates in a quartz nozzle projecting a short distance into the combustion chamber, and the conduit 13 for the hydrogen terminates in a like nozzle which is shown as projecting into the side of the combustion chamber. Projecting downwardly into the combustion chamber into the cover are one or more spark plugs such as are used in the ignition of the fuel in a gas or gasolene engine. These spark plugs are located relatively near the nozzles and are connected in an electric circuit so that electric sparks may be formed in the atmosphere of the gases in the combustion chamber. Preferably the spark plugs are removable so that, after the combustion in the chamber has been started and continued for some time, they may be removed and the apertures filled with plugs of any suitable material.

It will be observed that in the chlorin duct 15 there is formed an inlet 17 for the entrance of air (or oxygen from a suitable source) into the duct. This inlet is provided with a valve 18 by which the amount of air drawn into the duct may be regulated to vary the proportions of the chlorin and air delivered to the combustion chamber. I permit the entrance of sufficient air to supply oxygen for reaction with the hydrogen in the combustion chamber to produce an oxyhydrogen flame by which to support and maintain the combustion of the chlorin and hydrogen, as will be subsequently explained. Leading from the end of the combustion chamber, there is an eduction duct or conduit 19 for the products of combustion, including water vapor, and hydrochloric acid, and such inert gases, as nitrogen, as may be present. This conduit is connected with a condensing coil 20 over which water is permitted to drip for initially reducing the temperature of the products of combustion. Said coil in turn is connected with an earthenware coil 21 submerged in a tank 22 through which water is constantly flowing, for the condensation of the water vapor formed by the combination of the oxygen and hydrogen. The delivery end of the coil 21 is connected to an inclined pipe or conduit 23 midway between the ends thereof. The lower end of the conduit or pipe 23 is submerged in a tank 24 containing water. The upper end of the conduit 23 is connected to the lower end of the tower 25. Within the tower is placed any inert material such as quartz or coke, and through it trickles water delivered to the tower from a pipe 26 at the upper end thereof. Leading also from the top of the tower is an eduction conduit 27 with which is connected an exhaust pump 28.

The streams of mixed chlorin and air (nitrogen and oxygen) and of hydrogen are delivered into the combustion chamber with the hydrogen preferably in excess. An electric current is passed through the coils causing the formation of a series of sparks. Thereupon the hydrogen and the oxygen, which have a greater affinity than hydrogen and chlorin, are first ignited and burn with a steady flame. Sufficient hydrogen, however, is present for reaction with the chlorin also, and the combustion of the chlorin and hydrogen takes place, being supported and maintained by the combustion of the hydrogen and oxygen. The hydrochloric acid and the water vapor, which are formed by the reactions in the combustion chamber, are drawn therefrom by the exhaust fan through the condensing coils, the water vapor being condensed in the coil 21 and absorbing a portion of the hydrochloric acid which is in the presence thereof. The acidulated water and the unabsorbed hydrochloric acid pass into the pipe or conduit 23, the acidulated water flowing down into the tank 24, and the free hydrochloric acid, unused hydrogen and nitrogen being drawn upwardly through the tower by the exhaust fan. The hydrochloric acid, entering the tower, meets the stream of water trickling therethrough and is absorbed thereby, the acidulated water flowing downward through the pipe into the tank 24, the pipe being large enough and the supply of water being so regulated that the pipe 23 is never filled but always permits the passage of the hydrochloric acid into the tank 24.

Because of the high temperatures in the combustion chamber, due to the exothermic reactions which take place therein, it is necessary to use material for constructing the combustion chamber and the eduction duct leading therefrom, capable of withstanding high heat. I therefore, as previously stated, prefer to form the combustion chamber of fire-brick or other like material. It is desirable, however, to use quartz in the formation of the conduits for the hydrochloric acid resulting from the combustion. The degree, however, to which quartz may be heated without crumbling is limited and it is highly desirable, therefore, that some means be provided for reducing the temperature in the combustion chamber. This I accomplish in the present case by admitting nitrogen with the oxygen into the combustion chamber, and by providing a large excess of hydrogen necessary for the reaction with the oxygen and chlorin.

In lieu of having a direct inlet into the chlorin duct for the entrance of air or oxygen therein, I find, in actual practice, that this is not necessary, because of leaky connections between the combustion chamber and the cells from which the chlorin is drawn. This varies of course in actual practice, but I find that, under normal conditions, with cells used in the manufacture of caustic soda and bleach, the gas delivered through the conduit 15 to the combustion chamber, even though the air inlet 18 is closed, will consist approximately of 40% chlorin and 60% air, though these proportions constantly vary from one cause or another. In addition to the air, the gas entering through the chlorin duct has mixed with it a trace of moisture, but this does not interfere with the combustion, either of the oxygen or of the chlorin.

It will be observed that I have provided a gasometer 10 for the reception and storage of a supply of hydrogen, and that this gasometer communicates with the conduit 13 by a valved conduit 110. This is done in order that I may always have an excess supply of hydrogen for the steady combustion of the oxygen in the combustion chamber, should the cells 1 to 4 inclusive be temporarily shut down. It is not necessary, of course, that the hydrogen and the chlorin should be drawn from the same battery of cells; in fact, I find it convenient to draw the supply of hydrogen from one set of cells and to draw the chlorin from a different set, but in any case the cells are so connected as to supply an excess of the hydrogen. Hence, in the event that it be necessary to shut down either set of cells, it does not cause the cessation of the flame in the combustion chamber, since, by opening the air inlet and the valve in the conduit 110, a free supply of air is admitted to the chlorin duct, and the combustion of the oxygen in the atmosphere of hydrogen in the combustion chamber continues without intermission. If the cells supplying hydrogen be temporarily shut down, a sufficient supply of hydrogen is furnished from the gasometer.

The exhaust fan at the top of the tower maintains a vacuum of about one and one-half (1½) inches of water, and insures the drawing of the chlorin, air, and oxygen into the combustion chamber, and the passage of the unabsorbed hydrochloric acid into the tower for absorption by the water delivered thereto.

As will be seen from the foregoing, it is unnecessary to preheat any of the gases prior to their delivery to the combustion chamber, and that, after the combustion is once started, it will continue without interruption even if the supply of chlorin be shut off from time to time. Preferably a current is maintained in the spark-plug circuit for some time until the combustion is well started and is continuing evenly.

In the event that it be desired to make repairs in those portions of the apparatus beyond the combustion chamber, in which event the continued formation of hydrochloric acid would be objectionable on account of the fumes escaping into the air, the supply of chlorin may be cut off, and air and hydrogen fed into the said chamber, and the combustion of oxygen and hydrogen continued without any material reduction in the radiant heat of the walls of said chamber.

What I claim is:—

1. The herein described process of manufacturing hydrochloric acid, which consists in continuously supplying streams of hydrogen, oxygen and chlorin into contact with each other, and burning the hydrogen and chlorin and the hydrogen and oxygen simultaneously, and conducting away continuously and recovering the hydrochloric acid and water vapor produced by such combustion.

2. The herein described process of manufacturing hydrochloric acid, which consists in supplying streams of chlorin, oxygen and hydrogen into a combustion chamber, burning in said chamber the hydrogen and chlorin, supporting and maintaining such combustion by burning in said chamber hydrogen and oxygen, and conducting away and recovering the water vapor and the hydrochloric acid produced by such combustion.

3. The herein described process of manufacturing hydrochloric acid, which consists in supplying streams of chlorin, oxygen and hydrogen into a combustion chamber, burning in said chamber the hydrogen and chlorin, supporting and maintaining such combustion by burning in said chamber hydrogen and oxygen, conducting away the water vapor and the hydrochloric acid produced by said combustion, condensing the water vapor, absorbing hydrochloric acid therein, and recovering the acidulated product of condensation.

4. The herein described process of manufacturing hydrochloric acid, which consists in continuously supplying oxygen, chlorin and hydrogen, burning said chlorin and a portion of said hydrogen and simultaneously burning said oxygen and another portion of said hydrogen all in a common chamber, regulating the supply of hydrogen to provide an excess thereof over that needed for said reactions, for reducing the temperature in the combustion chamber, and continuously conducting away and recovering the products of combustion.

5. The herein described process of manufacturing hydrochloric acid, which consists in supplying a stream of chlorin and air, supplying a stream of hydrogen, simultaneously burning the chlorin, oxygen and hydrogen in a common chamber, conducting away the hydrochloric acid and water vapor produced by such combustion, condensing the water vapor, absorbing a portion of the said hydrochloric acid by the condensed water, absorbing the remaining hydrochloric acid by water from a separate source, and collecting all of the acidulated water.

6. The herein described process of manufacturing hydrochloric acid which consists in supplying streams of oxygen and hydrogen, with the hydrogen in excess, burning such hydrogen and oxygen in a chamber, supplying a stream of chlorin, burning such chlorin and hydrogen in said chamber and supporting and maintaining the combustion thereof by the combustion of said hydrogen and oxygen, and conducting away and recovering the hydrochloric acid produced by such combustion.

7. The herein described process of making hydrochloric acid which consists in supplying a stream of hydrogen and a stream of mixed air and chlorin to a chamber, simultaneously burning oxygen and chlorin of the first-mentioned stream and hydrogen of the second-mentioned stream in said chamber, conducting away nitrogen and the hydrochloric acid and water vapor produced by such combustion, and recovering the hydrochloric acid.

8. The herein described process of making hydrochloric acid which consists in supplying a stream of hydrogen and a stream of mixed air and chlorin to a chamber, simultaneously burning oxygen and chlorin of the first-mentioned stream and hydrogen of the second-mentioned stream in said chamber, conducting away nitrogen and the hydrochloric acid and water vapor produced by such combustion, condensing the water vapor and absorbing a portion of the hydrochloric acid therein, and recovering the remaining hydrochloric acid.

9. The herein described process of manufacturing hydrochloric acid, which consists in continuously supplying oxygen and an excess of hydrogen into a combustion chamber, continuously burning the oxygen and a portion of such hydrogen in said chamber, supplying chlorin into the chamber in the presence of the flame produced by such combustion and such excess hydrogen, burning such chlorin and the unconsumed hydrogen, and withdrawing and recovering the hydrochloric acid produced by said combustion.

10. The herein described process of manufacturing hydrochloric acid, which consists in supplying streams of chlorin and hydrogen to a chamber, igniting the chlorin and hydrogen and temporarily maintaining their combustion by forming a series of electric sparks in the presence of the mixed gases, and withdrawing and recovering the hydrochloric acid produced by such combustion.

11. An apparatus for the manufacture of hydrochloric acid comprising separate sources of chlorin and hydrogen, a combustion chamber, means for supplying streams of chlorin and hydrogen thereto from said sources, an electric circuit including one or more spark plugs projecting into the combustion chamber for igniting and temporarily maintaining the combustion of the said gases, and means for withdrawing and recovering the hydrochloric acid.

12. An apparatus for the manufacture of hydrochloric acid, comprising a combustion chamber, ducts for supplying streams of air, chlorin and hydrogen to said combustion chamber, means for conducting away hydrochloric acid and water vapor produced by the combustion in said chamber, and means for condensing the water vapor in the presence of said hydrochloric acid.

13. An apparatus for manufacturing hydrochloric acid, which comprises a combustion chamber, a duct for supplying hydrogen thereto, a duct for supplying mixed air and chlorin to said chamber, an inclined conduit to which the products of combustion are delivered, a recovery tank with which the lower end of said conduit communicates, and an absorbing tower communicating with the other end of said conduit.

In testimony whereof I have affixed my signature, in presence of two witnesses.

ALF ENGELSTAD.

Witnesses:
MARCUS B. MAY,
P. W. PEZZETTI.